United States Patent

Martin

[15] 3,691,933

[45] Sept. 19, 1972

[54] AUTOMATIC COFFEE BREWER WITH LIQUID LEVEL SENSOR

[72] Inventor: John C. Martin, Springfield, Ill.

[73] Assignee: Bunn-O-Matic Corporation, Springfield, Ill.

[22] Filed: July 6, 1971

[21] Appl. No.: 159,767

[52] U.S. Cl. .................................................99/282
[51] Int. Cl. .................................................A23f 1/08
[58] Field of Search........99/280, 281, 282, 283, 300, 99/295, 304, 307

[56] References Cited

UNITED STATES PATENTS

| | | | |
|---|---|---|---|
| R25,663 | 10/1964 | Bunn | 99/282 |
| 3,179,035 | 4/1965 | Lockett | 99/282 |
| 3,348,468 | 10/1967 | Eisendrath | 99/282 |
| 3,450,024 | 6/1969 | Martin | 99/295 |

Primary Examiner—Robert W. Jenkins
Attorney—Robert R. Lockwood

[57] ABSTRACT

Cold water flows into a basin above a tank of hot water until a predetermined level is reached. A liquid level sensor then shuts off the flow of water into the basin and opens a valve to permit all of the water in the basin to flow into the tank from which the same quantity is siphoned out for brewing coffee.

10 Claims, 4 Drawing Figures

PATENTED SEP 19 1972 3,691,933

AUTOMATIC COFFEE BREWER WITH LIQUID LEVEL SENSOR

This invention relates to coffee brewing apparatus and constitutes an improvement over the constructions disclosed in the U. S. Patent No. Re. 25,663, issued Oct. 13, 1964 and U.S. Pat. No. 3,450,024, issued June 17, 1969 and in the patents and re-ferences cited therein.

Among the objects of this invention are: To provide for automatically supplying a predetermined quantity of water for coffee brewing purposes without requiring the use of a timer and independently of the water supply pressure; to shut off the supply of cold water when the water flowing into a basin reaches a predetermined level; to employ a liquid level sensor for this purpose; for the liquid level sensor to employ a probe with an integral switching circuit; to open simultaneously a cold water supply valve to permit water to flow into the basin and shut a dump valve to prevent water from flowing out of the basin into a hot water tank; for the dump valve to provide a length of flexible tubing that can be pinched closed; to protect the liquid level sensor by a baffle which limits agitation of the water in its vicinity; and to provide a baffle in the path of the incoming water to distribute it uniformly in the basin.

Figure 3:
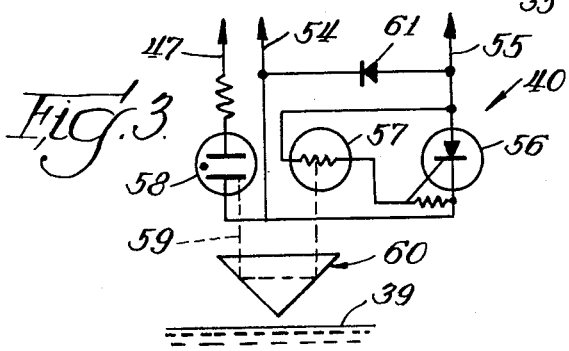

FIG. 3 illustrated diagrammatically the circuit connections that can be employed for the liquid level sensor, the illustration showing the operation before the water level reaches its maximum height.

Figure 4:
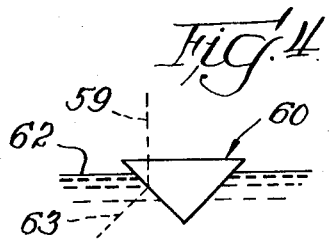

FIG. 4 shows how the water level, at the predetermined height, affects the operation of the liquid level sensor.

Figure 1:
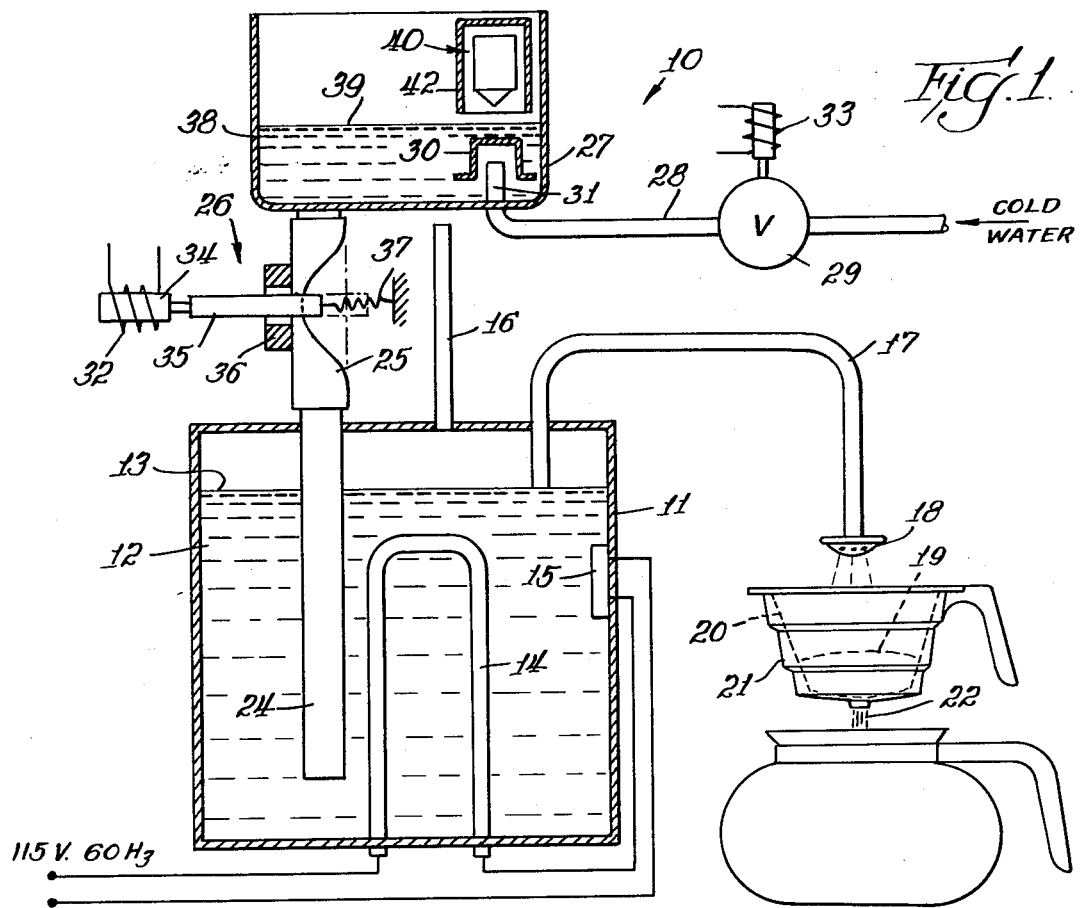
FIG. 1 is a view, partly in cross section showing an automatic coffee brewer embodying this invention.

In FIG. 1 reference character 10 designates, generally, an automatic coffee brewer embodying this invention. The automatic coffee brewer 10 includes a hot water tank 11 that may be formed of metal or of plastics material. Normally the tank 11 is filled with hot water 12 to the level indicated at 13. The temperature of the water 12 is maintained by an immersion electric heating element 14 under the control of a thermostat 15. As indicated the arrangement is such as to supply energy to the heating element 14 through the thermostat 15 from a suitable current source such as a 115 volt 60 Hz source. A vent tube 16 extends upwardly from the upper end of the tank 11 to place it in communication with atmospheric pressure. A siphon tube 17 is employed to withdraw hot water from the tank 11 to supply it to a spray head 18 for application to ground coffee 19 on a filter 20 which is located in a funnel 21. Coffee extract 22 flows from the funnel 21 into a suitable receptacle as will be understood.

For replacing the hot water that is displaced from the tank 11 there is provided a cold water inlet pipe 24 which may be formed of metal or plastics material. The inlet pipe 24 extends downwardly through the upper end of the tank 11 and opens near the bottom to minimize mixing with the hot water at the upper end of the tank 11. The cold water inlet pipe 24 includes a section 25 of flexible tubing which forms a part of a dump valve that is indicated, generally, at 26. The flexible tubing section 25 extends between the upper end of the inlet pipe 24 and the bottom of a cold water basin 27 which is located above the tank 11 and may be formed of metal or plastics material. Cold water is supplied to the basin 27 through an inlet water line 28 which is connected to a source of cold water under pressure which may vary widely. Inserted in the inlet water line 28 is a cold water supply valve 29 which normally is closed. Within the basin 27 there is provided a baffle 30 overlying the discharge or inlet end 31 of the water line 28. The purpose of the baffle 30 is to distribute more uniformly the incoming cold water so that it rises uniformly in the basin 27.

Figure 2:
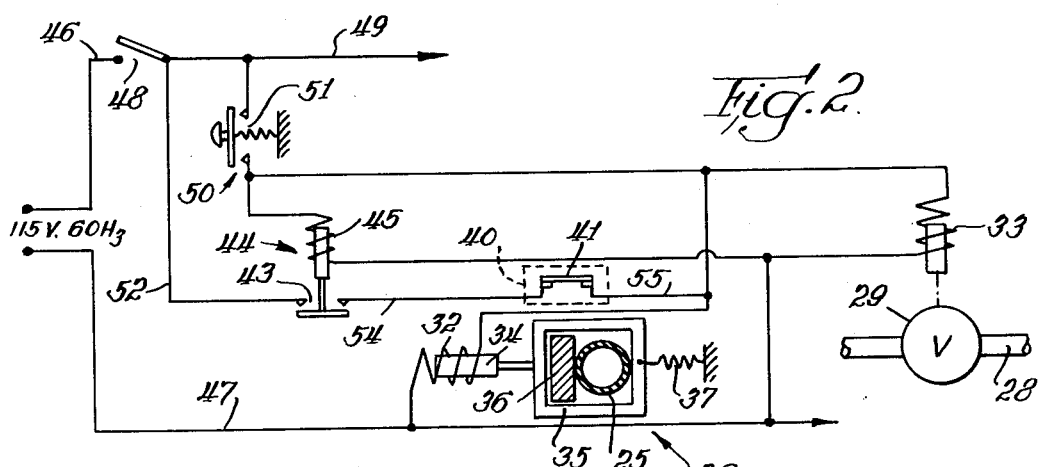
FIG. 2 shows diagrammatically the circuit connections that can be employed for the automatic coffee brewer shown in FIG. 1.

The dump 26 is normally open and is arranged to be closed only when cold water is flowing into the basing 27. The dump valve 26 is arranged to be closed by a solenoid 32 and the supply valve 29 is arranged to be opened by a solenoid 33. Normally the supply valve 29 is biased by a spring(not shown) to the closed position. Associated with the solenoid 32 is an armature 34 which is connected to a frame 35 that surrounds the section 25 of flexible tubing as shown more clearly in FIG. 2. On energization of the solenoid 32 the frame 35 is moved to the left to pinch the section 25 of flexible tubing between it and a stationary block 36 and to tension a spring 37 which is arranged to retract the frame 35 on de-energization of the solenoid 32. For each coffee brewing cycle the cold water 38 in the basin 27 is completely dumped by opening of the dump valve 26. The level 39 of the water 38 rises in the basin 27 until it reaches a liquid level sensor that is indicated, generally, at 40 and is represented in FIG. 2 by normally closed contacts 41. In order to insure that the level of the water 38 in the basin 27 is uniform a baffle 42 is arranged to enclose the liquid level sensor 40. Thus it is responsive to the true level of the water 38 in the basin 27 for preventing further inflow of cold water and for initiating the outflow of the cold water into the tank 11.

As illustrated in FIG. 2 the normally closed contacts 41 of the liquid level sensor 40 are connected through normally open contacts 43, when closed, of a relay that is indicated, generally, at 44. The relay 44 has a winding 45. For energizing the system conductors 46 and 47 are employed. As indicated they may be energized from a suitable 115 volt 60 Hz source. A main switch 48 is arranged to connect conductor 46 to another conductor 49 with the control system being then energized between conductors 49 and 47 on closure of the main switch 48.

For initiating the brewing cycle there is provided a start switch that is indicated, generally, at 50. When it is manually depressed contacts 51 are closed to energize the winding 45 and the solenoids 32 and 33 in parallel between the energized conductors 49 and 47. A holding circuit is then completed at contacts 43 of the relay 44 through the normally closed contacts 41 of the liquid level sensor 40 and through a conductor 52 to the energized conductor 49. Conductors 54 and 55 connect the normally closed contacts 41 in the circuit.

FIG. 3 illustrates the circuit details of the liquid level sensor 40 which may be employed to respond to the level of the water 38 in the basin 27. This circuit includes an SCR 56 the conductivity of which is controlled by a light responsive device 57 from a light source 58 which may be a neon lamp. Light rays, indicated by broken line 59, are reflected by a prism 60 and applied to the light responsive device 57. Under these conditions the SCR 56 conducts half cycles of the alternating current to maintain and energize the winding 45 and the solenoids 32 and 33. A diode 61 is connected across conductors 54 and 55 to reduce chatter of the contacts 43 of the relay 44.

In operation the tank 11 normally is filled with hot water 12 to the level indicated at 13. The funnel 21 is charged with ground coffee 19 and placed in operative position under the spray head 18. After closure of main switch 48 the start switch 50 is depressed to energize winding 45 of the relay 44 and the solenoids 32 and 33. After momentary operation of the start switch 50, the holding circuit is completed through the normally closed contacts 41 and the contacts 43 of the relay 44 as described. The dump valve 26 is closed to prevent flow of any cold water from the basin 27 into the tank 11 while the valve 29 is opened to permit inflow of cold water through the water line 28 into the basin 27. The water level 39 rises in the basin 27 until, as shown in FIG. 4, the water level at 62 impinges upon the prism 60. Now the light rays, instead of being reflected for application to the light responsive device 57, are refracted as indicated at 63. The SCR 56 ceases to conduct and in effect opens the normally closed contacts 41. This interrupts the holding circuit for the winding 45 of the relay 44 and the solenoids 32 and 33. Thereupon the previously closed dump valve 26 is opened by the spring 37 and the supply valve 29 is closed. This provides an accurate control of the amount of cold water 38 that is supplied to the basin 27 for the coffee brewing cycle.

By adjusting the height of the liquid level sensor 40 in the basin 27 various quantities of cold water 38 can be measured as may be required depending upon the strength of the coffee extract 22 that is required.

I claim:

1. Coffee brewing apparatus comprising a hot water tank, means for heating water in said tank, a siphon tube for withdrawing hot water from said tank to brew coffee extract, a cold water inlet pipe extending upwardly through said tank, a dump valve in said cold water inlet pipe, a cold water basin above said hot water tank connected to said cold water inlet pipe, an inlet water line interconnection said cold water basin and a source of cold water under pressure, a cold water supply valve in said inlet water line, means for closing said dump valve and opening said cold water supply valve to cause cold water to flow into said basin, and means for opening said dump valve and closing said cold water supply valve when a predetermined quantity of cold water has flowed into said basin.

2. Coffee brewing apparatus according to claim 1 wherein means substantially simultaneously close said dump valve and open said cold water supply valve and vice versa.

3. Coffee brewing apparatus according to claim 1 wherein a liquid level sensor is arranged to open said dump valve and close said cold water supply valve when the water in said basin reaches a predetermined level.

4. Coffee brewing apparatus according to claim 3 wherein said liquid level sensor includes a probe having an integral switching circuit.

5. Coffee brewing apparatus according to claim 3 wherein said liquid level sensor includes normally closed switch means controlled by a light responsive device, a light source and a prism for directing rays from said light source to said light responsive device as long as said prism is not contacted by water in said basin.

6. Coffee brewing apparatus according to claim 3 wherein a baffle encloses said liquid level sensor to permit the actual level of the liquid to be detected thereby.

7. Coffee brewing apparatus according to claim 3 wherein a baffle overlies the discharge end of said inlet water line to distribute the incoming cold water and prevent surges thereof to contact said liquid level sensor.

8. Coffee brewing apparatus according to claim 1 wherein said dump valve includes a section of flexible tubing forming a part of said cold water inlet pipe, and means for pinching said flexible tubing.

9. Coffee brewing apparatus according to claim 1 wherein a solenoid is arranged to operate said dump valve, another solenoid is arranged to operate said cold water supply valve, means are connected to energize said solenoids through normally closed circuit means, and means open said normally closed circuit means when the cold water in said basin reaches a predetermined level.

10. Coffee brewing apparatus according to claim 9 wherein said means for energizing said solenoids includes a relay having normally open contacts connected in series with said normally closed circuit means and an operating winding connected in parallel with said solenoids, a manually operable switch connects said winding and said solenoids for energization to a current source, and circuit means connect said contacts to said current source to provide a holding circuit for said winding and said solenoids when said manually operable switch is opened.

* * * * *